United States Patent [19]
Leal et al.

[11] Patent Number: 5,624,156
[45] Date of Patent: *Apr. 29, 1997

[54] CHILD SAFETY SEAT WITH ENTERTAINMENT SYSTEM

[76] Inventors: Horacio Leal; Teresita Leal, both of 11500 SW. 92nd Ave., Miami, Fla. 33176; Israel Kaganas, 3802 NE. 207th St., Apt. 2901, Miami, Fla. 33180

[*] Notice: The term of this patent shall not extend beyond the expiration date of Pat. No. 5,482,352.

[21] Appl. No.: 618,070

[22] Filed: Mar. 25, 1996

[51] Int. Cl.⁶ .................. A47C 7/72; A47C 1/08
[52] U.S. Cl. .................. 297/217.4; 297/217.3; 297/250.1; 297/256.15; 297/219.12
[58] Field of Search .................. 297/217.4, 217.3, 297/217.1, 250.1, 256.15, 219.12, 188.06, 188.18

[56] References Cited

U.S. PATENT DOCUMENTS

| | | | |
|---|---|---|---|
| 2,270,598 | 1/1942 | Morgan | 297/188.06 |
| 2,501,993 | 3/1950 | Conradt | 297/217.4 X |
| 2,527,656 | 10/1950 | Reinsdorf | 297/217.4 X |
| 3,019,050 | 1/1962 | Spielman | 297/217.4 X |
| 4,310,307 | 1/1982 | Bellisario | 297/217.4 X |
| 4,440,443 | 4/1984 | Nordskog | 297/217.4 X |
| 4,824,168 | 4/1989 | Makoski | 297/188.06 X |
| 4,979,777 | 12/1990 | Takada | 297/217.4 X |
| 4,982,996 | 1/1991 | Vottero-Fin et al. | 297/217.3 |
| 5,143,055 | 9/1992 | Eakin | 297/217.4 X |
| 5,147,109 | 9/1992 | Jolly | 297/217.4 |
| 5,177,616 | 1/1993 | Riday | 297/217.3 X |
| 5,179,447 | 1/1993 | Lain | 297/217.3 X |
| 5,316,369 | 5/1994 | Kanda | 297/217.3 X |
| 5,482,352 | 1/1996 | Leal et al. | 297/217.4 |
| 5,490,711 | 2/1996 | Pollock | 297/217.1 X |
| 5,507,556 | 4/1996 | Dixon | 292/217.3 |

FOREIGN PATENT DOCUMENTS

| | | | |
|---|---|---|---|
| 1342284 | 1/1974 | United Kingdom | 297/217.4 |
| 4000206 | 1/1994 | WIPO | 297/217.4 |

Primary Examiner—Peter M. Cuomo
Assistant Examiner—Rodney B. White
Attorney, Agent, or Firm—Robert M. Downey, P.A.

[57] ABSTRACT

An entertainment system includes a child's seat such as a car seat, high chair, or stroller, an audio source supported on the seat, speakers positioned and disposed at preferred audible locations on the seat and conductors extending between and interconnecting the audio source to the speakers. A video device, interconnecting to the audio source, may further be provided for presenting a video picture at a preferred viewing orientation relative to a child in the seat.

10 Claims, 7 Drawing Sheets

CHILD SAFETY SEAT WITH ENTERTAINMENT SYSTEM

BACKGROUND OF THE INVENTION

1. Field of the Invention

The present invention relates to an entertainment system for use on a child's seat and, more particularly, to an audio and video system adapted for interconnection to a child's seat to entertain the child when seated therein.

2. Description of the Related Art

It is well-known that most children will not remain seated very long without becoming restless or agitated. In fact, many children will try to climb out of their seat or, begin to yell and scream if they are strapped in the seat, after only a few minutes. This can be especially stressful to passengers in a vehicle, and particularly the driver, when a child refuses to remain quietly seated within a child safety.

In the past, attempts to address this problem have proposed entertaining a child when seated in a car seat or stroller in an effort to occupy the child's attention. Examples of such proposed solutions include fitting car seats, strollers, high chairs, and the like with such gadgets as dials, spinning wheels, knobs, and other moving and/or attention-grabbing objects. More effective solutions to this problem are found in the U.S. patents to Takada, U.S. Pat. No. 4,979,777 and Leal, et al., U.S. Pat. No. 5,482,352. Takada discloses a child safety seat for vehicles which includes speakers built-in to the upper side panels of the seat which interconnect to a sound producing apparatus built-in to the seat. The sound producing apparatus is activated by a detecting means, such as a pressure sensing switch in the seat bottom, for detecting the presence or absence of a child in the seat. When a child is seated in the seat, the sound generating apparatus is activated to produce sound that is emitted from the speakers.

Our previous invention, disclosed in U.S. Pat. No. 5,482,352, is directed to a child seat having audio producing means. Specifically, our previous invention includes an audio source and speakers carried on a child seat, wherein music or other audio programs are audible to a child in the seat. In one embodiment, the speakers are built-in to the seat and they interconnect to an audio source housed in a compartment on the side of the seat. In another embodiment, the speakers are fitted within a cover or apron which removably attaches to the seat and the audio source is carried in a pocket, pouch, or other carry means on a side panel of the cover. A wire harness interconnects to the speakers and extends through the cover to a jack in the audio source carry means. The jack plugs into the audio source carried on the cover so that upon activation of the audio source, sound is emitted from the speakers which is audible to a child in the seat.

While the various proposed solutions in the prior art are somewhat effective to capture a child's attention when seated in a car seat or like device, they have several shortcomings which limits their commercial feasibility. In particular, the child safety seat disclosed in the Takada patent is expensive to manufacture, requiring custom design and fitting of the components therein. Furthermore, the activation of the audio source by detecting presence or absence of the child is not desirable in that it prevents control by the parent or adult occupants in the vehicle. Most importantly, the Takada seat apparatus is not readily adaptable to existing child seat products nor does it lend itself for installation within commonly found child seat designs.

Furthermore, the various devices in the related art fail to address interconnection of a video source to a child seat which, together with the audio source, provides a more complete entertainment system. It is believed that a child's attention can be captured for a much longer period of time when providing both visual and/or audio stimulation. The present invention proposes a more effective and complete solution to the problems associated with keeping a child quietly seated for extended periods of time in a car seat or like device, by accommodating for both audio and/or visual entertainment.

SUMMARY OF THE INVENTION

The present invention is directed to an entertainment system specifically adapted to a child seat, such as a car seat, a high chair or stroller, and which includes speaker means supported on the child seat and structured to project sound therefrom which is audible to a child in the seat. An audio source of any suitable type for generating sound signals to be sent to the speaker means is removably carried on the seat. The speaker means can be removably attachable to the seat, a seat cover, or built-in to the side panels of the seat. Conductor means are provided for electrically interconnecting the audio source to the speaker means. The audio source is removably carried on the side of the seat using Velcro, support brackets, a pouch or any other suitable type of fastening means on a seat cover.

The present invention may further include video means for presenting a video presentation to the child when in the seat. The video means interconnects to the audio source so that sound associated with the video program is audible when viewing the video presentation. The video means may be built-in to the seat structure or, alternatively, provided as an independent, remote unit which interconnects to the audio circuitry by a conductor having a jack or other like means.

The components of the system are powered by an electric power source such as batteries within the system or an external power source such as a DC power source or a battery.

Accordingly, it is a primary object of the present invention to provide an entertainment system on a child seat which includes one or more speakers which interconnect to an audio source removably carried on the seat.

It is still a further object of the present invention to provide an entertainment system adapted for use on a child's safety seat which includes both audio and video means thereon.

It is still a further object of the present invention to provide an entertainment system on a child safety seat including at least one speaker, an audio source for generating sound signals to be delivered to the speaker, conductor means for electrically interconnecting the audio source to the speakers, and video means for presenting a video presentation viewable to a child in the seat.

It is still a further object of the present invention to provide an entertainment system, as set forth above, wherein the video means is built-in to the seat.

It is yet another object of the present invention to provide an entertainment system, as set forth above, wherein the video means is provided as an independent unit.

These and other objects and advantages of the present invention will be more readily apparent in the description which follows.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
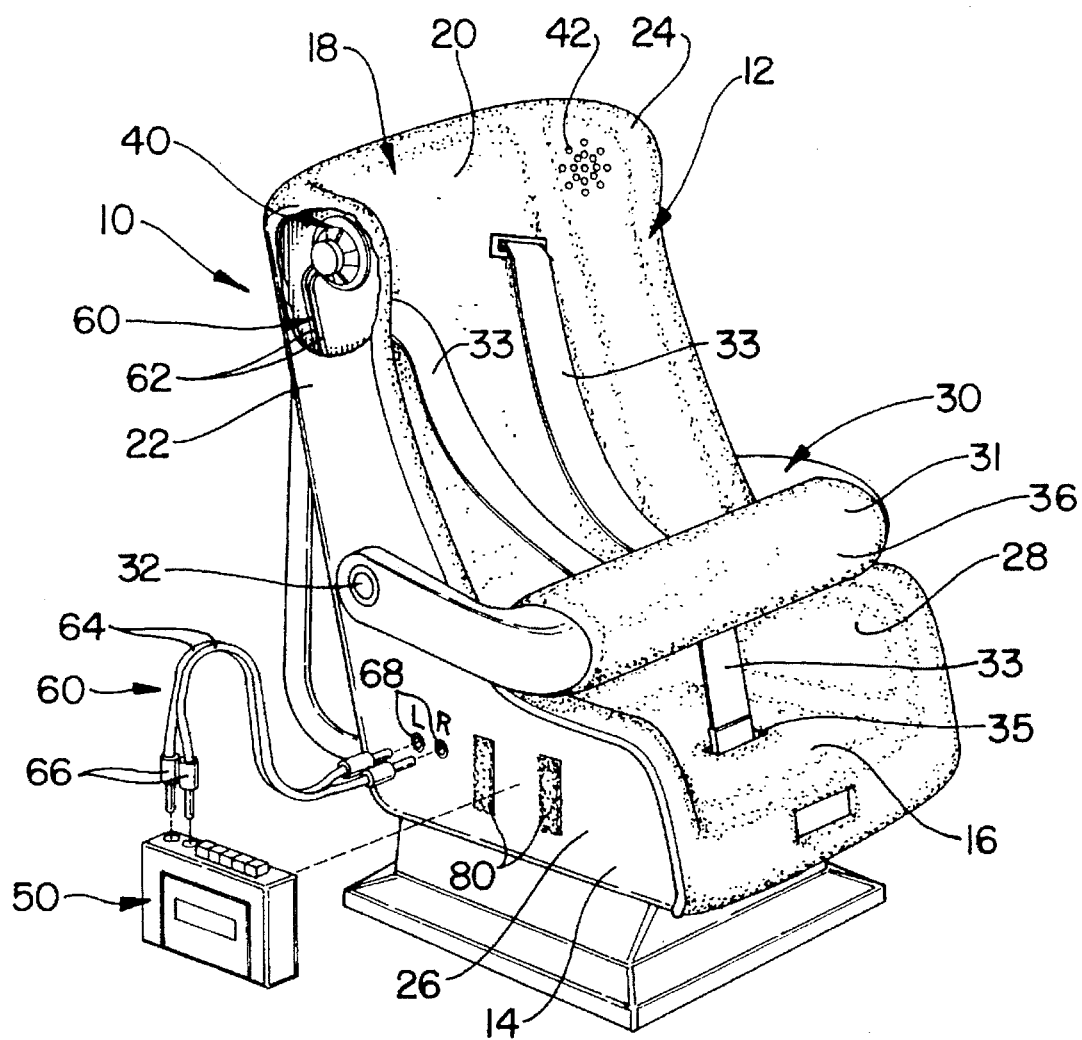
FIG. 1 is a perspective view illustrating a first preferred embodiment of the present invention.

Referring to the several views of the drawings, and particularly FIGS. 1–4, there is illustrated various embodiments of the entertainment system of the present invention, generally indicated as 10.

The system 10 includes a child's safety seat 12, such as a car seat having a base 14 with a lower seat portion 16 and a vertical portion 18. The seat may also be a stroller or a high chair. The vertical portion 18 includes a backrest 20 and upper side panels 22, 24 on opposite sides of the backrest 18. Arm rest panels 26, 28 extend from a lower portion of the upper side panels on opposite sides of the lower seat portion 16. In this particular embodiment, a safety bar or cross arm member 30 is shown which extends across the seat, between the opposite arm rest panels, so that a mid-section 31 of the cross arm member 30 is disposed generally in front of the child's lower torso and above the child's waist when seated in the seat 12. Opposite ends of the safety bar or cross arm member 30 are hingedly attached to sides of the seat 12 such as at 32, as seen in FIGS. 1–4. The opposite hinge is not seen in FIGS. 1–4, but is identical to that shown on the one side. The cross arm member 30 moves between a raised position to allow a child to get into and out of the seat 12 and a lowered secured position, as seen in FIGS. 1–4, to protectively contain the child within the safety seat 12. Means to releasably lock the cross arm member 30 are provided, such as strap members 33 which lock into a mechanism 35 in the base of the seat 12. The strap means 33 may also serve as a safety harness, crossing over the child's shoulders and upper torso. A resilient, soft cushion, such as a cushioned sleeve member 36, may be provided across the mid-section 31 of the cross arm member 30 to further protect the child. While the embodiment shown includes a safety bar, the seat may be provided without a safety bar.

The entertainment system of the present invention further includes one or more speakers 40 which are supported by any of various means on the seat 12 and structured to project sound therefrom in an optimal direction which is audible to a child in the seat 12. An audio source 50 for generating sound signals to be delivered to the speakers 40 is further provided and may include generally any device structured to generate electrical sound signals such as, but not limited to, an AM/FM radio, a cassette tape player, a CD player, a micro chip, a laser disc player, a videocassette player, or other audio means which may be adapted to store a pre-recorded audio program on a storage medium or a device adapted to receive an RF signal or a satellite signal. The audio source 50 is electrically connected to the speakers by conductor means 60 which may include internal wires 62 and/or external wires 64 having jack means 66 on ends thereof to plug into the audio source 50 and directly to the speakers 40 or to input ports 68 on the seat 12 which are electrically connected to the speakers 40 by the internal conductor 62.

The system 10 of the present invention may further include video means 70 including a video monitor 72 connectable to the audio source 50 or another video audio playing source, such as a VCR player 76, so that an audio program corresponding to a video program can be heard through the speakers 40 as the child views the video programming on the video monitor 72.

Referring to FIG. 1, one embodiment of the above described system 12 is shown wherein the speakers 40 are internally installed within the upper side panels 22, 24 of the seat 12 so that the speakers 40 project sound through an array of small apertures 42 or other sound transferring medium on the inner facing surfaces of the upper side panels 22, 24. The audio source 50 is shown in this embodiment to be removably attachable to the seat 12 using hook and loop fastening means 80, such as velcro, on both the outer facing side of the seat 12 and a back surface of the audio source 50 housing. Alternatively, other attachment means may be provided to removably attach the audio source to the seat such as, but not limited to, hooks, pockets, clips and the like. The audio source 50 interconnects to the internal speaker wiring using cables for the left and right audio channels. Alternatively, a single cable for dual channels may be used.

Figure 2:
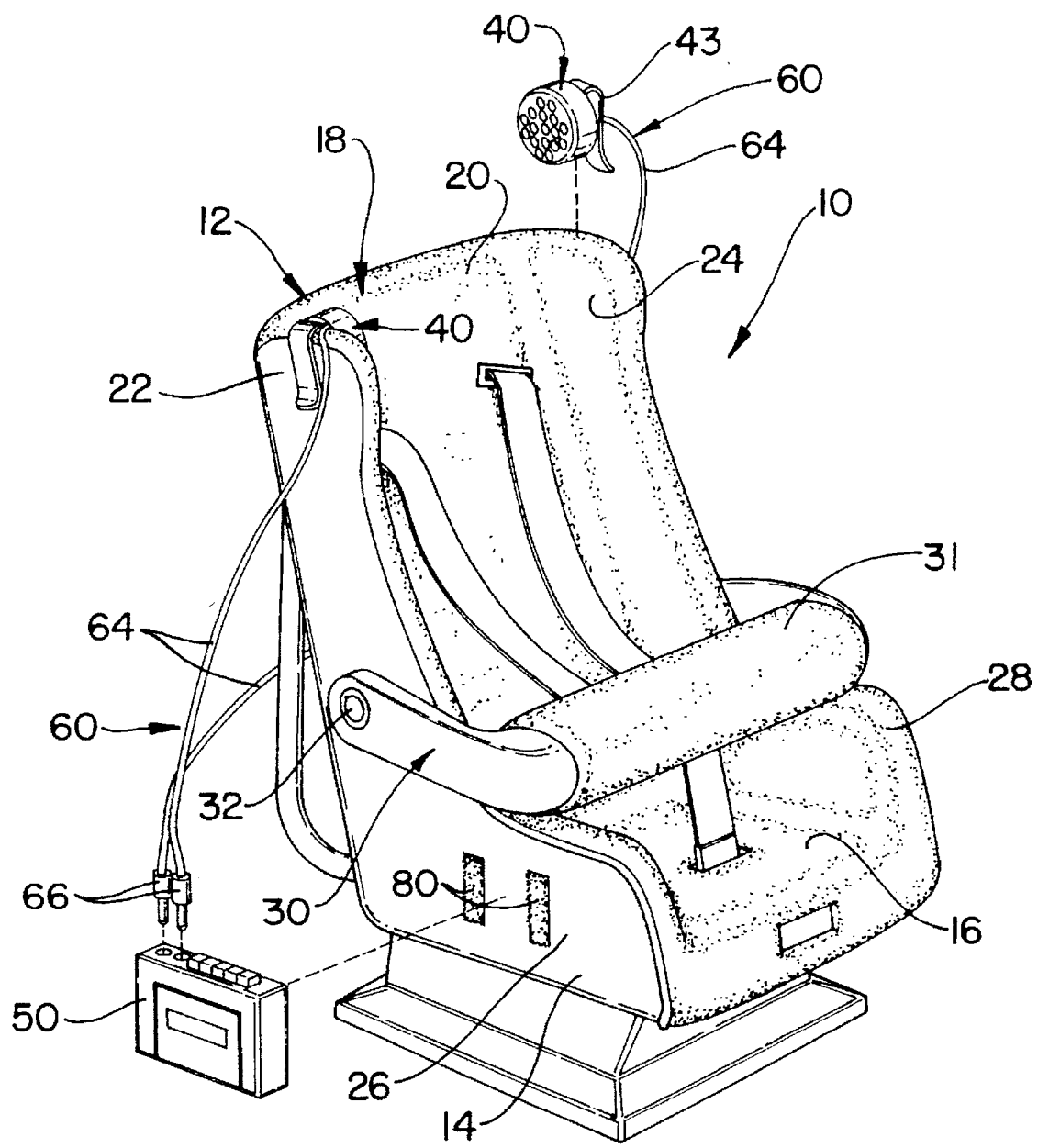
FIG. 2 is a perspective view illustrating another preferred embodiment of the present invention.

Another preferred embodiment of the entertainment system is shown in FIG. 2 wherein the speakers 40 are removably attachable to the seat 12. In this particular embodiment, the speakers 40 are provided with clips 43, or other releasable attachment means such as, but not limited to, hook and loop fasteners, snaps, brackets, and the like, to releasably attach the speakers 40 on the seat 12 for optimal audibility, the speakers 40 are preferably supported on the upper side panels 22, 24 so that the sound emitted therefrom is directed inwardly towards a child's ears when seated in the seat 12. In this particular embodiment, the audio source 50 is shown to be connected to the speakers 40 using external cables/conductors which plug into the audio source. Similar to the embodiment of FIG. 1, the audio source 50 can be removably supported on the side of the seat 12.

Figure 3:
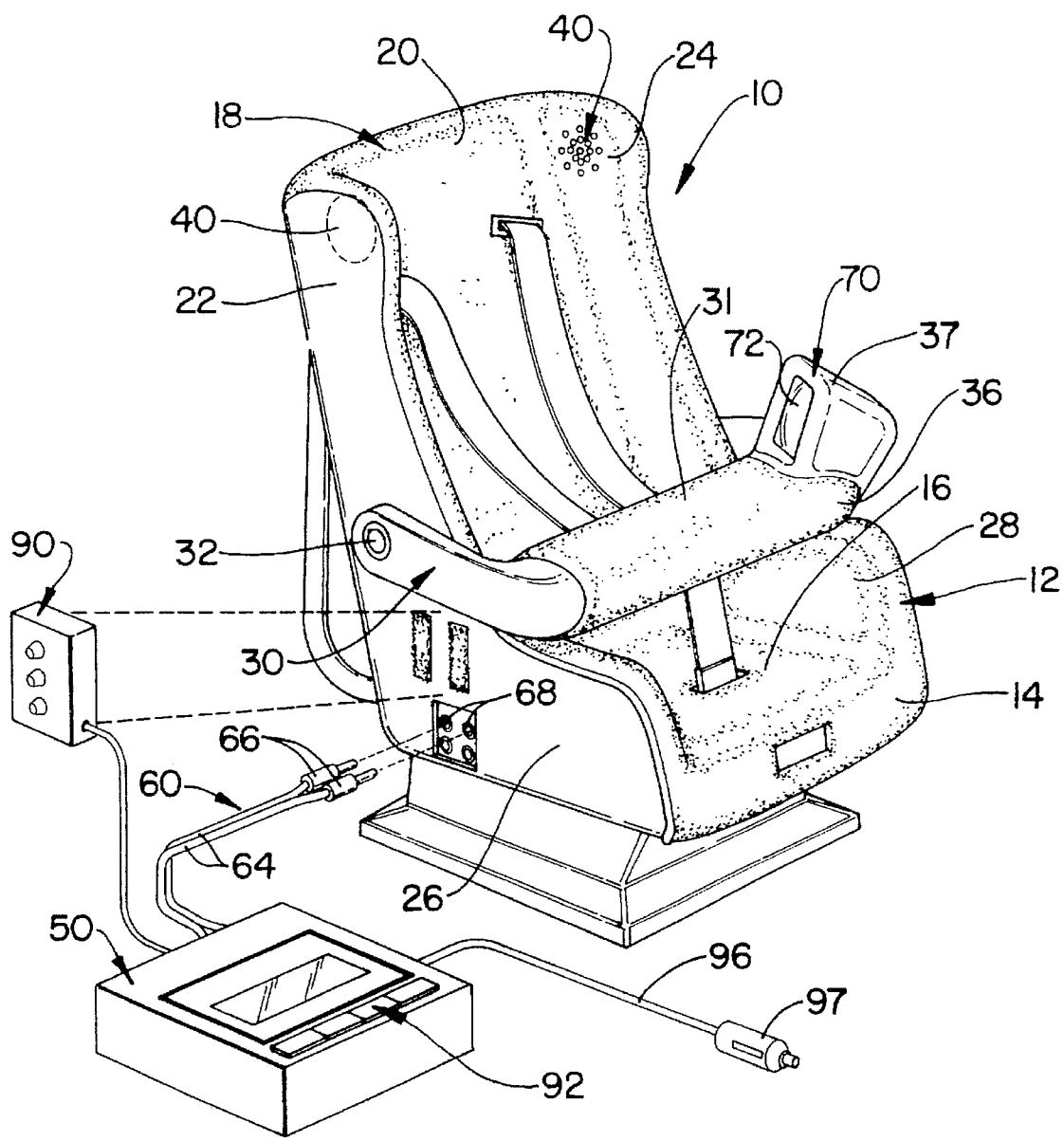
FIG. 3 is a perspective view illustrating still another preferred embodiment of the present invention.

Referring now to FIG. 3, another preferred embodiment of the present invention is shown wherein the entertainment system 10 further includes the video means 70 including the video monitor 72 integrally formed on the cross arm member 30; positioned and disposed thereon in an optimal viewing orientation relative to a child in the seat 12. The housing of the monitor 72 may be covered with a soft, resilient cushioning material 37 similar to that of the sleeve 36 to protect the child from impact when raising and lowering the cross arm member 30 or if the child is caused to lurch forward, as may occur during sudden braking of a vehicle within which the seat 12 is installed. In this particular embodiment, the speakers 40 are shown installed within the internal structure of the seat 12, in the upper side panels 22, 24. However, it should be noted that the speakers 40 could also be removably attached on the seat in the same general manner as described in reference to FIG. 2, or alternatively, to a seat cover, as described in more detail hereinafter. Control means 90 may further be provided on the seat to control various aspects of the audio signal such as the base, treble and volume. The control means can be removably attachable to the seat for adaptation to existing seat structures. Likewise, control means 92 may be provided on the audio source, as necessary.

In order to provide power to the audio source 50, video means 70 and/or possibly an amplifier 100, a power cord 96 may be provided having a jack 97 adapted for connection to a cigarette lighter socket in a vehicle. Alternatively, a plug may be provided for interconnection to a conventional AC outlet.

Figure 4:
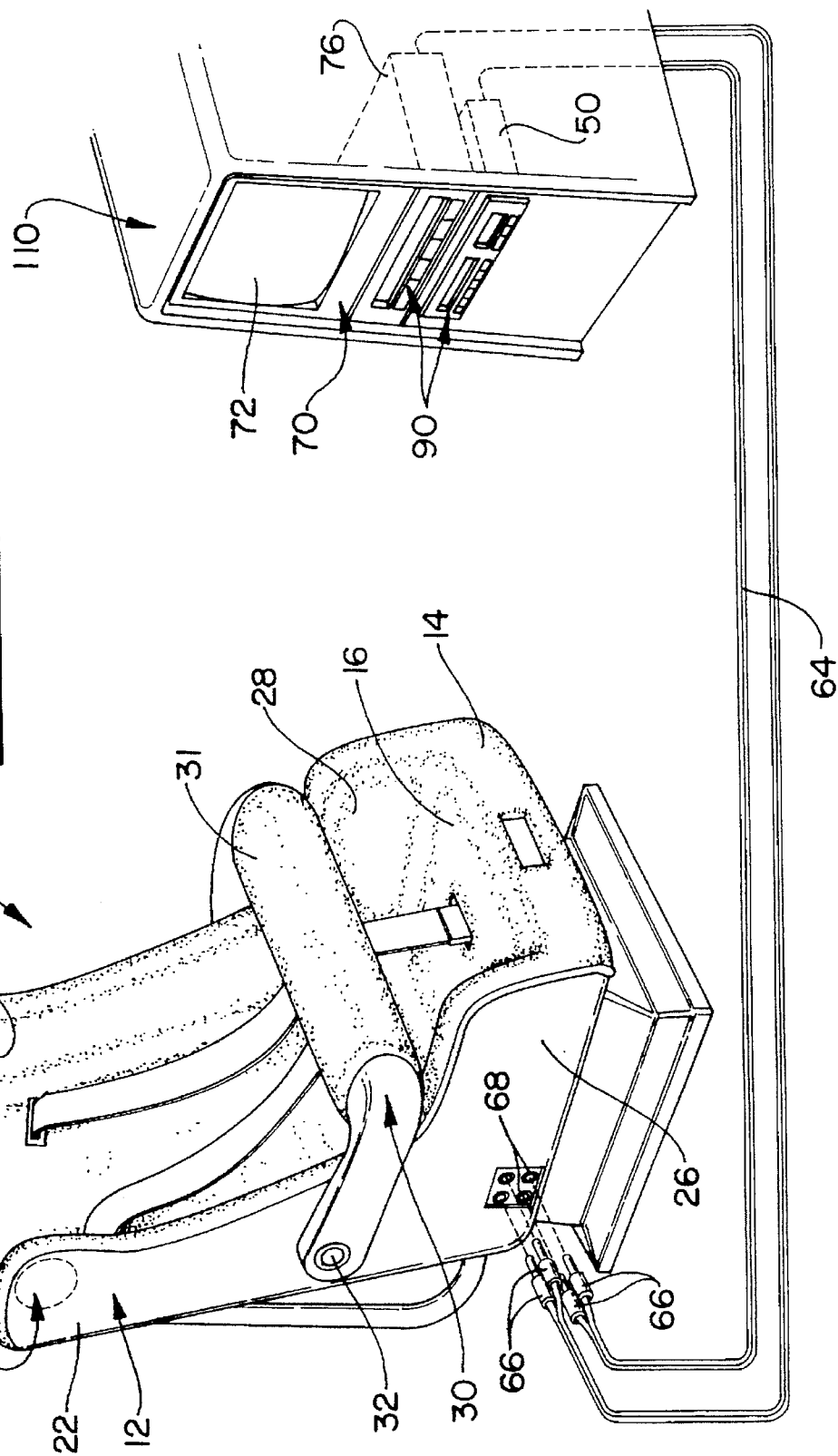
FIG. 4 is a perspective view illustrating still another preferred embodiment of the present invention.
Figure 5:
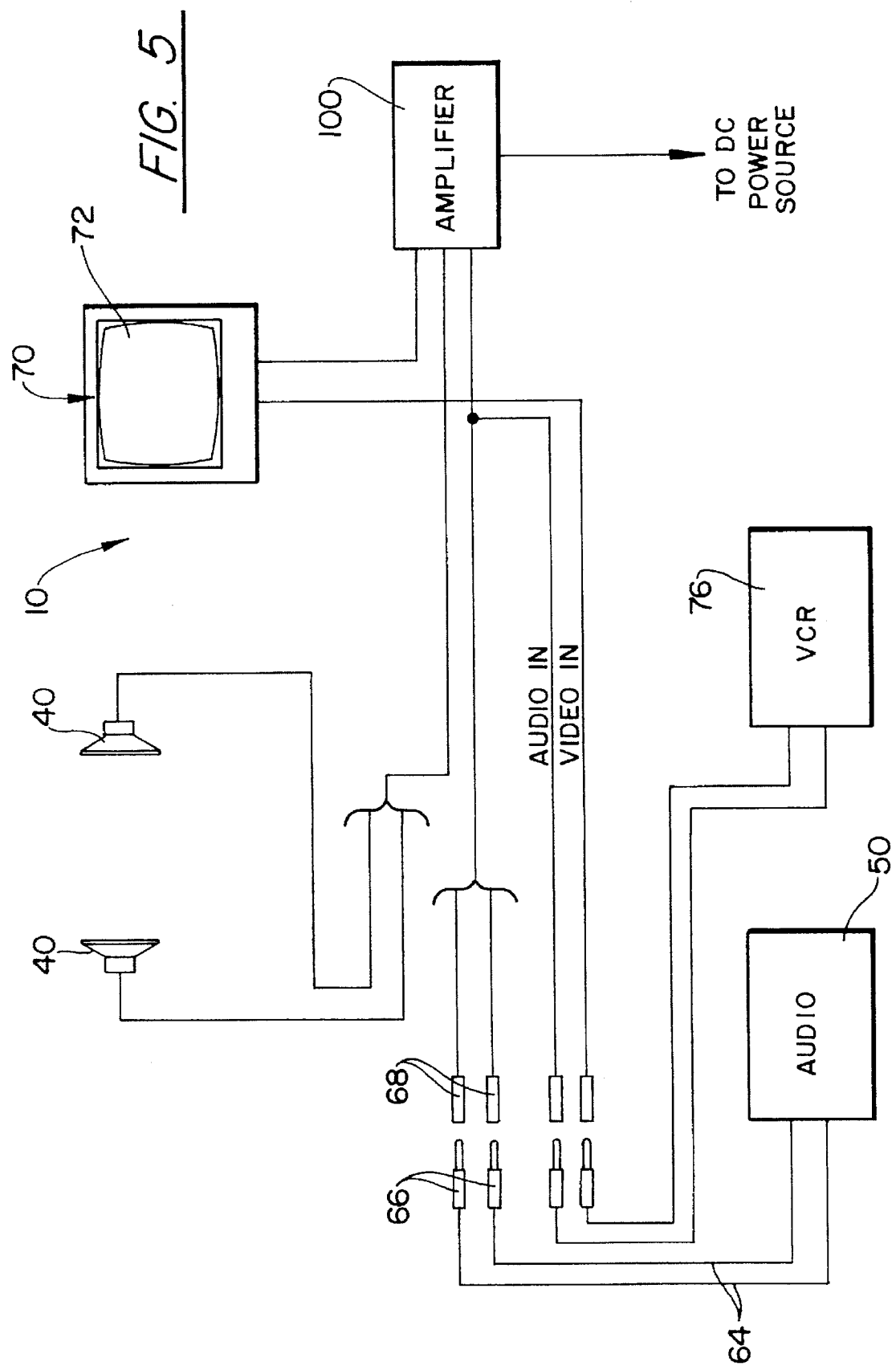
FIG. 5 is a schematic illustrating interconnection of the various components of the embodiment of FIG. 3.
Figure 6:
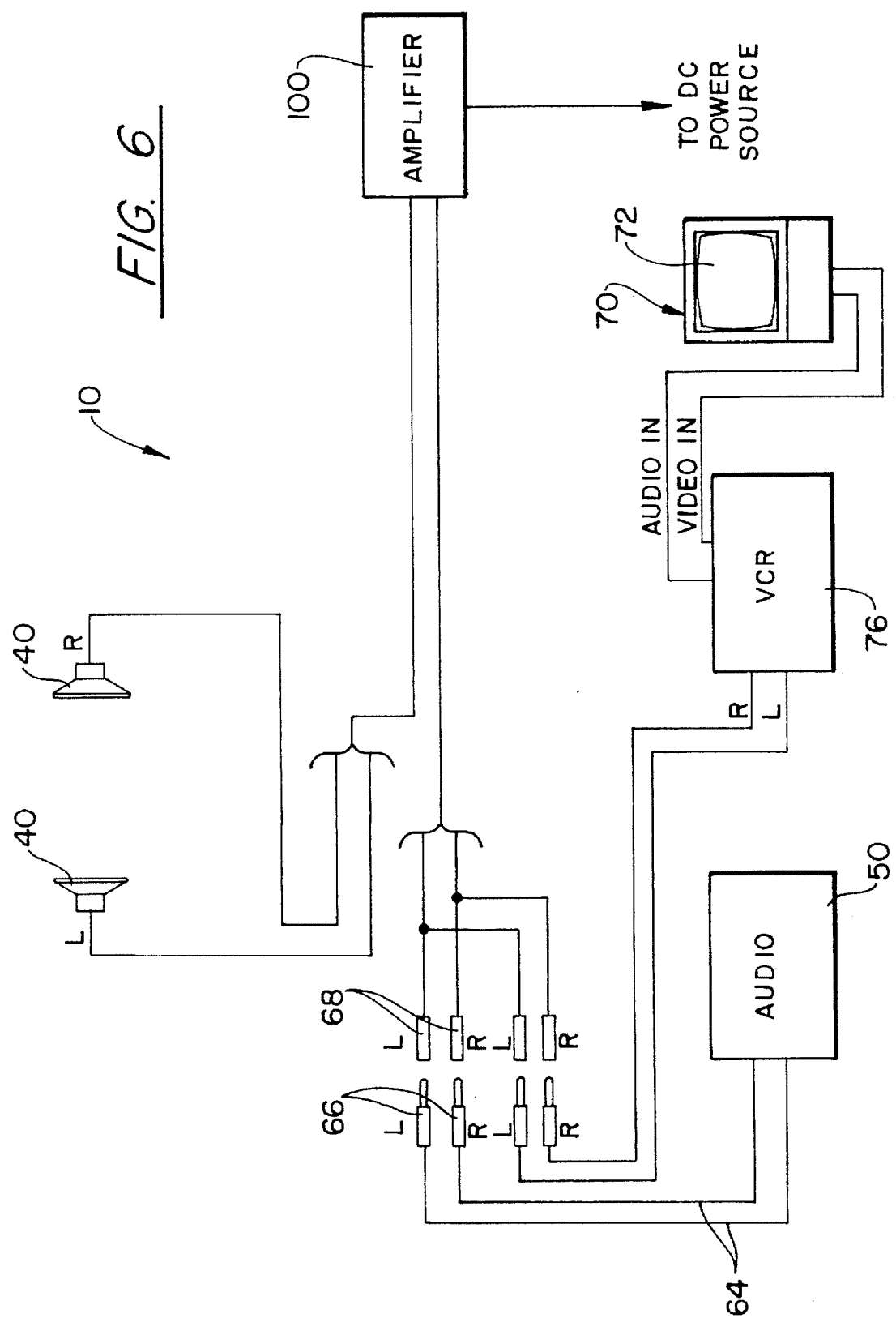
FIG. 6 is a schematic illustrating interconnection of the various components of the embodiment of FIG. 4.

FIG. 4 shows still another embodiment of the invention wherein an independent, stand alone console 110 is provided to house the video means 70, including the video monitor 72 therein. The console 110 may further accommodate the audio source 50 as well as a VCR 76 or other audio/video playing means. As illustrated in FIGS. 4 and 6, the VCR 76 and audio source 50 connect with a lead to the amplifier 100 which amplifies the sound signals received from the VCR 76 and audio source 50 for subsequent transmission to the speakers 40. The VCR 76 interconnects with the monitor 72 in the conventional manner to feed the video signal thereto.

Accordingly, the embodiments of FIGS. 3 and 4 enable a child to view a video program on the monitor 72 while simultaneously listening to the audio program component associated with the video program, which is transmitted through the speakers 40.

Figure 7:
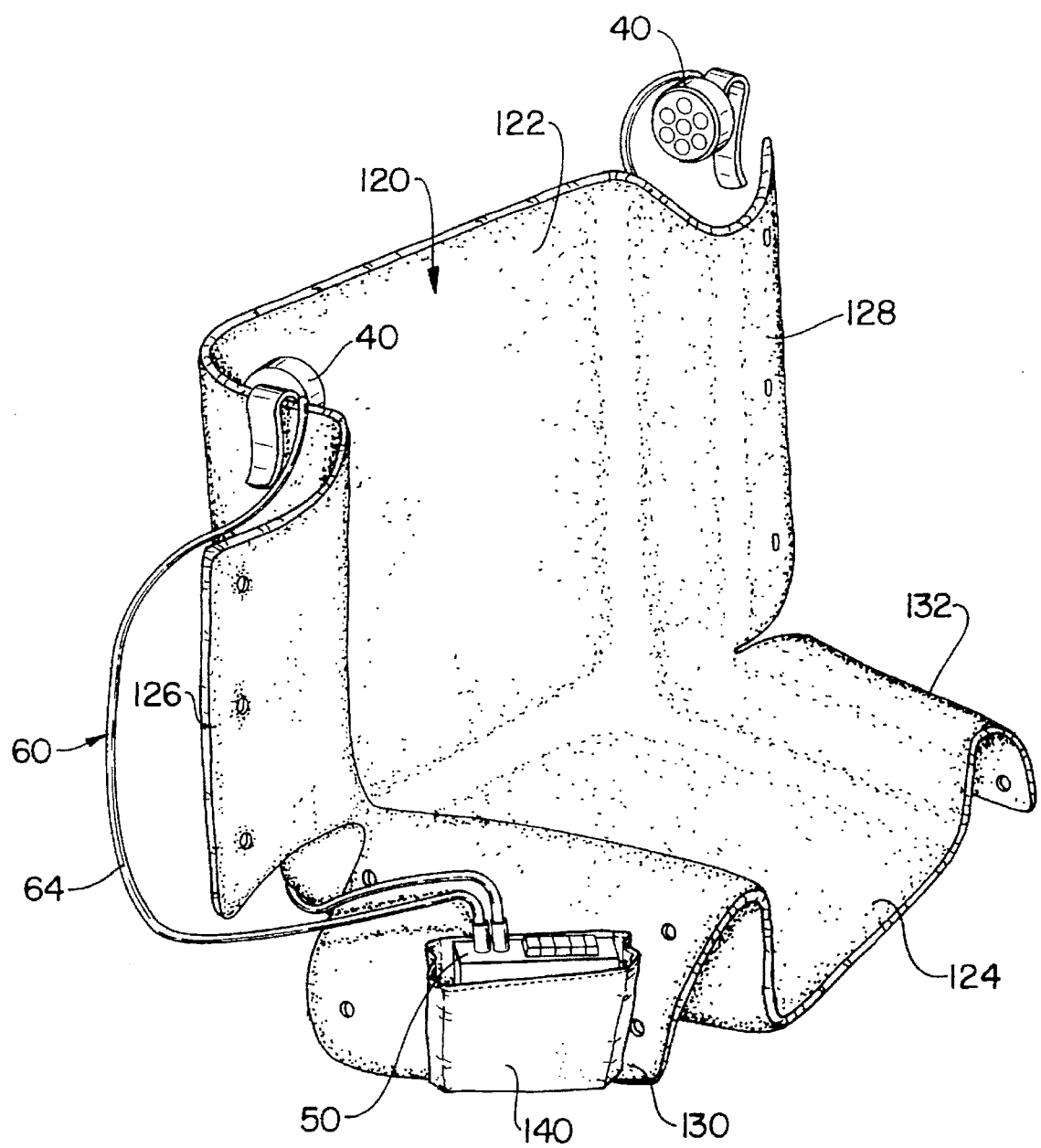
FIG. 7 is a perspective view of a seat cover for attachment to the seat.

FIG. 7 is a perspective view of a seat cover 120 for use in combination with the seat 12 and, particularly, to cover the lower seat portion 14 and backrest 20, as well as the upper side panels 22, 24 and lower arm rest portions 26, 28, to further enhance the comfort of the seat 12. The seat cover 120 may be provided a back panel portion 122 to a lower seat cover portion 124, opposite upper side panels 126, 128 and lower opposite side flaps or panels 130, 132. With the cover 120 attached to the seat 12, the back panel 122 is disposed in covering relation to the backrest 20 of the seat 12 and the lower seat cover 124 is disposed in covering relation to the lower seat portion 14. The opposite side panels 126, 124 overlie the external surfaces of the corresponding opposite upper side panels 22, 24 of the seat, and the lower side flaps 130, 132 overlie the exterior exposed surfaces of the lower arm rest panels 26, 28.

The seat cover 120 may be provided with a pouch, pocket, or other carry means 140 for supporting the audio source 50 therein. The speakers 40 can be attached to the top edge of the upper side panels 126, 128 of the seat cover 120 using clips or other fastening means as described above, so that the speakers 40 are positioned and disposed in an optimal orientation to direct sound inwardly towards a child's ears when seated in the seat.

Having described the general nature of the seat cover 120, in the manner in which the audio source 50 and speakers are supported thereon, it can be readily appreciated that when the seat cover 120 becomes soiled, the speakers 40 and audio source 50 can be easily removed and the seat cover can, therefore, be washed without damaging the electronic components of the system 10.

While the instant invention has been shown and described in what is considered to be preferred and practical embodiments thereof, it is recognized that departures may be made within the spirit and scope of the present invention which, therefore, should not be limited except as set forth in the following claims and within the doctrine of equivalents.

Now that the invention has been described,
What is claimed is:

1. An entertainment assembly comprising:
   a seat including a base having an upper support surface, and a vertical portion including a backrest and opposite sides, a safety bar hingedly attached at opposite ends to said seat, said safety bar being movable between a raised position and a lowered, secured position and including a mid-section extending across a front of said seat and generally disposed in front of a user's lower torso and above a user's waist when seated in said seat with said safety bar in said lowered position, speaker means removably supported on the opposite sides of said vertical portion of said seat and structured to project sound therefrom in a direction which is audible to a user seated in said seat, an audio source, remote from said speaker means, for generating sound signals to be delivered to said speaker means, means for removably carrying said audio source on said seat, and conductor means for electrically interconnecting said audio source to said speaker means.

2. An assembly as recited in claim 1 wherein said means for removably carrying said audio source on said seat includes a seat cover structured to be removably fitted to said seat in at least partially covering relation to said base and said vertical portion and including a pocket means for removable receipt of said audio source therein.

3. An assembly as recited in claim 2 wherein said speaker means are removably attachable to said seat cover.

4. An assembly as recited in claim 1 further including video means for presenting a video picture viewable to a user seated in said seat.

5. An assembly as recited in claim 4 wherein said video means is housed and positioned in an independent unit separate from said seat.

6. An assembly as recited in claim 4 wherein said video means is housed within said seat.

7. An entertainment assembly comprising:
   a seat including a base having an upper support surface, and a vertical portion including a backrest and opposite sides, speaker means removably supported on the opposite sides of said vertical portion of said seat and structured to project sound therefrom in a direction which is audible to a user seated in said seat, an audio source, remote from said speaker means, for generating sound signals to be delivered to said speaker means, means for removably carrying said audio source on said seat, video means for presenting a video picture viewable to a user seated in said seat, and conductor means for electrically interconnecting said audio source to said video means and said speaker means.

8. An assembly as recited in claim 7 wherein said video means is housed and positioned in an independent unit separate from said seat.

9. An assembly as recited in claim 8 wherein said video means is housed and contained within said seat.

10. An entertainment assembly comprising:
    a seat including a base having an upper support surface and oppositely disposed arm rest panels, and a vertical portion including a backrest and upper side panels on opposite sides of said vertical portion, said opposite side panels extending along the opposite sides of the backrest from a top edge of the backrest to corresponding ones of the oppositely disposed arm rest panels, a safety bar hingedly attached at opposite ends to said seat, said safety bar being movable between a raised position and a lowered, secured position and including a mid-section extending across a front of said seat and generally disposed in front of a user's lower torso and above a user's waist when seated in said seat with said safety bar in said lowered position, speaker means removably supported on said seat and structured to project sound therefrom in a direction which is audible to a user seated in said seat, an audio source, remote from said speaker means, for generating sound signals to be delivered to said speaker means, means for removably carrying said audio source on said seat, video means housed and contained within said safety bar for presenting a video picture viewable to a user seated in said seat, and conductor means for electrically connecting said audio source to said video means and said speaker means.

* * * * *